Figure 1:
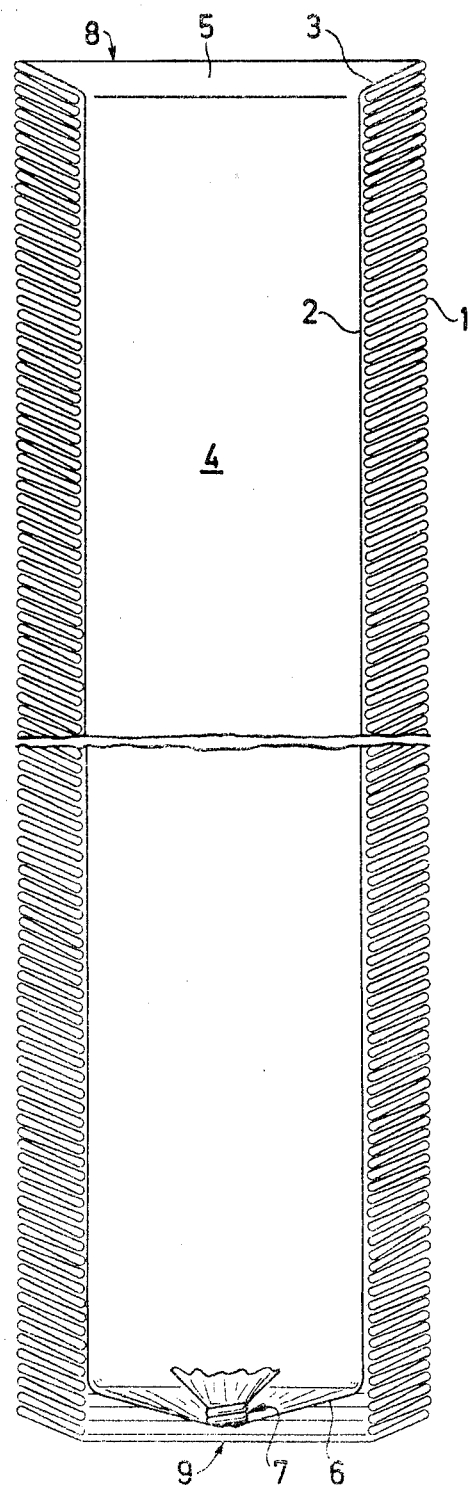

United States Patent [19]

Köstner et al.

[11] 4,407,339
[45] Oct. 4, 1983

[54] DOUBLE-WALLED HOLLOW ROD OF FLEXIBLE TUBULAR MATERIAL

[75] Inventors: Armin Köstner, Wiesbaden; Richard Lenhart, Wiesbaden-Frauenstein; Klaus-Jürgen Bittner, Wiesbaden, all of Fed. Rep. of Germany

[73] Assignee: Hoechst Aktiengesellschaft, Fed. Rep. of Germany

[21] Appl. No.: 189,477

[22] Filed: Sep. 22, 1980

Related U.S. Application Data

[60] Division of Ser. No. 914,158, Jun. 9, 1978, Pat. No. 4,273,551, which is a continuation-in-part of Ser. No. 413,622, Nov. 7, 1973, abandoned.

[30] Foreign Application Priority Data

Nov. 9, 1972 [DE] Fed. Rep. of Germany ....... 2254731

[51] Int. Cl.$^3$ .............................................. B65B 3/04
[52] U.S. Cl. ..................... 141/10; 141/114; 17/33
[58] Field of Search ............... 141/10, 114, 313–317, 141/392, 98, 1; 426/138, 140; 206/802; 17/33, 34, 35; 53/451, 469, 558; 493/243, 267, 455

[56] References Cited

U.S. PATENT DOCUMENTS 1,546,360  7/1925  Bates ..................................... 141/10
1,568,734  1/1926  Hellerman .
2,715,903  8/1955  Scholl .
3,274,005  9/1966  Alsys .
3,540,184  11/1970  Ashton .
3,639,130  2/1972  Paul et al. .

FOREIGN PATENT DOCUMENTS 1060403  3/1967  United Kingdom .
1080387  8/1967  United Kingdom .

Primary Examiner—Houston S. Bell, Jr.
Attorney, Agent, or Firm—James E. Bryan

[57] ABSTRACT

A process for the manufacture of a tubular package filled with pasty material which comprises (a) positioning a filling tube of a filling device inside the inner tube of a tubular rod of flexible material, said rod comprising an inner tube substantially free from folds and a shirred outer tube, the hollow space of said shirred outer tube constituting a casing for said inner tube and said inner tube being a deshirred length of the tubular rod which is inverted into the hollow space of said shirred outer tube thus forming a double-walled rod, wherein the outside surface of said inner tube and the inside surface of said outer tube are in direct contact, the inner tube being integral with the outer tube at one of its ends and sealed at the other; in a manner such that the filling tube adjoins the seal of the rod, and (b) feeding pasty material from the filling device through the filling tube into said inner tube of the rod, and simultaneously turning the tube forming the shirred stick inside out under a frictional contact between the outside surface of the deshirred inner tube and the inside surface of the shirred outer tube, whereby the shirred outer tube is progressively unfolded by the pressure exerted in introducing the pasty material.

8 Claims, 2 Drawing Figures

DOUBLE-WALLED HOLLOW ROD OF FLEXIBLE TUBULAR MATERIAL

This application is a division of application Ser. No. 914,158, filed June 9, 1978, now U.S. Pat. No. 4,273,551, in turn, a continuation-in-part of application Ser. No. 413,622, filed Nov. 7, 1973, and now abandoned.

The invention relates to the manufacture of tubular packaging containing a pasty filling, especially sausage manufacture.

Tubular sleeves which have been shirred by folding and compression to give the so-called "sticks" are already used in sausage manufacture. These shirred sticks are essentially single-walled over their entire length. As the shirred stick is filled, for example with a sausage composition, it unfolds itself. Generally, the shirred stick will have an end seal. Preferred materials for such shirred sticks are synthetic polymeric materials, papers impregnated and coated with suitable polymeric material or, especially, cellulose hydrate.

In the manufacture of the known shirred sticks, it is customary to use tubings having on at least one of its surfaces a coating, for example chemical lubricating agent, on the inner surface of the tube before shirring in order to facilitate the formation of folds during the shirring process. The chemical lubricating agent remains on the inner surface of the stick after shirring. There is therefore a danger that lubricant subsequently can mix with the contents of the tube, with possible adverse effect.

Because of their method of manufacture, cellulose hydrate tubes have a smoother, less structured, surface on the outside than on the inside. When such shirred sticks are filled, therefore, the contents tend to adhere to the structured inner surface of the tube. This is particularly likely to occur in sausage manufacture when a meaty filling is used; the sausage skin cannot be completely detached from its contents.

In the manufacture of the known shirred sticks it is further known to use a tubing having on at least one of its surfaces a coating consisting of polymeric material.

The mechanically stiff tubular double-walled hollow rod employed in the invention includes a tightly shirred outer tube and a tube which is free from folds and is arranged in the hollow space of said shirred outer tube, said shirred outer tube constituting a casing for said tube free from folds.

The length of the tube free from folds being arranged in the hollow space of the casing formed by the shirred outer tube corresponds essentially to the length of said shirred outer tube.

The tube free from folds is arranged in the hollow space of the casing in such a manner that its outside is directly adjacent to the inside of the casing. One of the ends of the tube free from folds is integral with the shirred outer tube. The two coherent parts of the rod are joined only in the region of transition. The free end of the unfolded tube is sealed; said seal is located within the hollow space of the shirred outer tube and does not project from the latter.

The tubing forming the rod preferably is composed of paper impregnated with polymeric material, especially fiber-reinforced cellulose hydrate. The coating provided on the tube may, e.g., consist of oil or of a synthetic polymer, e.g., a vinylidene chloride copolymer or a cationic thermosetting resin. Tubes of cellulose hydrate which are preferably fiber-reinforced and one surface of which is coated with a vinylidene chloride copolymer or a water insoluble resin from the group of the reaction products of epichlorihydrin and polyamine-polyamide and reactions products of melamine and formaldehyde or urea and formaldehyde have been previously proposed and are, as such, not a subject matter of the present invention.

A tube suitable for the manufacture of the rod employed in the invention may, for example, be a fiber-reinforced cellulose hydrate tube which has a coating of a cationic resin, e.g., a reaction product of epichlorhydrin and polyamine-polyamide, on its outside and is, on the inside, coated with oil serving as a lubricant.

By the direct contact between the outside surface of the tube free from folds and the inside surface of the shirred outer tube a frictional contact is produced between the two surfaces.

The wall of the film tube forming the double-walled tubular hollow rod has no openings through which any liquid or a pasty or fluid or granular filling might escape. This means that the wall of the film tube is physically homogeneous and uninterrupted.

The terms "mechanical stiffness" and "mechanical stability" are meant to denote the same physical fact.

The mechanical stability of the shirred outer tube—constituting a casing for the tube free from folds arranged in its cavity—ensures the mechanical stiffness of the double-walled tubular rod.

"Shirred stick" stands for the starting product used for the manufacture of the rod according to the invention. The shirred stick is manufactured by lengthwise shirring a flexible tube of a certain length, the wall of which is substantially free from openings and which is provided with a coating on at least one side. The shirred stick is uniformly and tightly shirred and characterized by mechanical stiffness.

Processes for the lengthwise shirring of flexible tubes and devices for the performance of such processes have been previously proposed and are not a subject matter of the present invention.

The terms "mechanically stiff" or "of high mechanical stability" are used to, e.g., characterize a hollow double-walled rod or the shirred stick—forming an integral part of this rod—, resp., having a length of about 50 cm and manufactured by lengthwise shirring a tube of about 50 m length, which rod does not bend under the load of its own weight, when held at one end with its longitudinal axis extending horizontally.

It is a characterizing feature of the casing comprising the shirred outer tube of the double-walled tubular rod that it is uniformly and tightly shirred and has a main fold, the edge of which extends along an imaginary line around the circumference of the casing; between neighboring sections of the main fold secondary folds are arranged which are formed automatically by the shirring procedure. By a tightly folded, lengthwise shirred stick a shirred stick is to be understood which is reduced in length in a ratio of from 1:70 up to 1:100, as compared to the initial tube from which it has been manufactured by lengthwise shirring.

The present invention provides a process for the manufacture of a tubular packaging filled with pasty material which comprises the steps of (a) positioning a filling tube of a filling device inside the inner tube of a rod or positioning the rod around the filling tube, such that the filling tube adjoins the seal of the rod, and (b) feeding pasty material from the filling device via the filling tube into the rod.

The pasty material may be a substance intended for a technical use, for example, putty, or a foodstuff, in particular a sausage composition.

When filling the contents into tubes, serving for the manufacture of tubular packagings, on automatic filling machines, it is advantageous to use sticks which are sealed at one end. While in the course of filling conventional single-walled shirred sticks sealed at one end, the unfolding of the shirred stick caused by the pressure exerted in introducing the contents starts from the end at which there is the end seal; the unfolding in the case of the double-walled rod employed in the invention takes place in such a way that the unfolding during filling starts from the end of the stick corresponding to the orifice of the rod.

The use of the rod is described in further detail, by way of example only, with reference to the production of sausages:

The rod, composed of fiber-reinforced cellulose hydrate film tubing is pushed over the filling tube of a known sausage filling device in such a way that the filling tube enters the cavity of the inner tube of the rod, and the rod is pushed over the filling tube of the sausage filling device to the point that the orifice of the filling tube comes to be approximately in the vicinity of the seal of the inner tube of the rod. Meat emulsion is then continuously pressed into the inner cavity of the rod through the filling tube of the sausage filling machine. As a result of the pressure exerted by the sausage emulsion on the sealed end of the inner tube of the rod, the inner tube is progressively pushed forward in accordance with the sausage emulsion pressed into the filling space of the rod and in doing so the shirred, outer tube is necessarily progressively unfolded.

As a result of its peculiar structure the double-walled hollow rod possesses particularly high inherent mechanical stability or stiffness and is therefore less sensitive to mechanical flexural stress in use than are the known shirred sticks.

Figure 2:
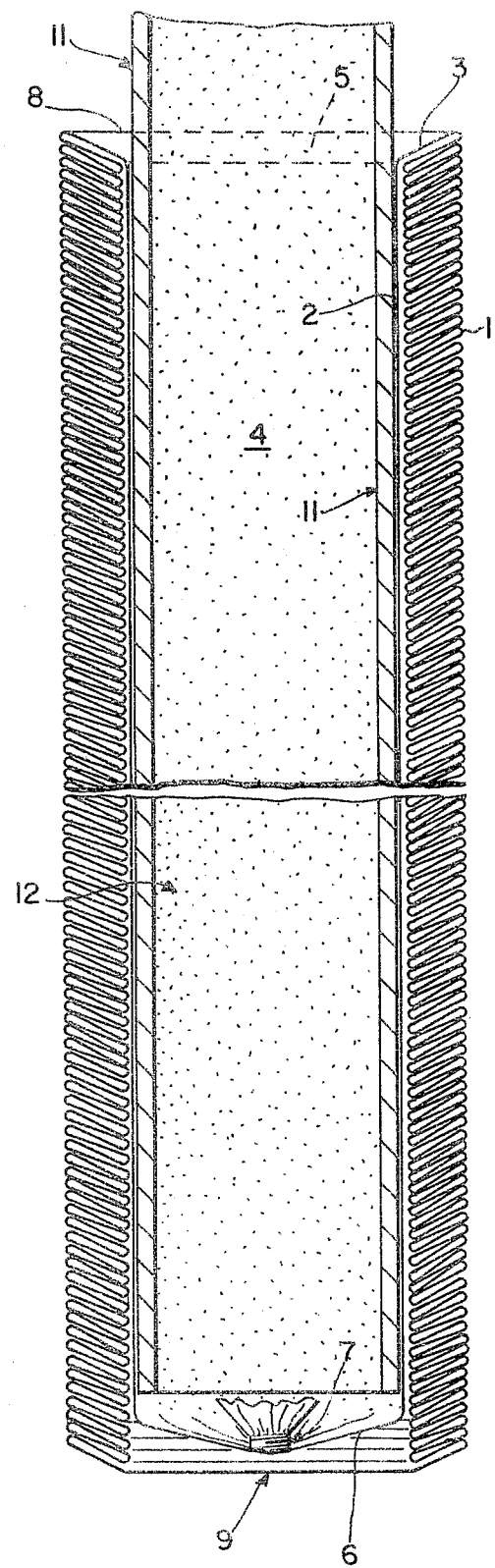

The invention will now be explained in further detail, by way of example only, with reference to the accompanying drawings, in which:

FIG. 1 is an axial cross-section of a rod employed in the process of the present invention, and FIG. 2 is an axial cross-section of the rod shown in FIG. 1 with a filling tube positioned inside the inner tube of the rod.

The double-walled rod is composed of a shirred outer tube 1 and an inner tube 2 free of folds, the shirred outer tube 1 constituting a casing of the inner tube 2 in its hollow space; 1 and 2 are made from a single piece of tubing having on at least one surface a coating, with a transition zone 3 between them. The rod has a cavity 4 for filling, a filling orifice 5 at its first end 8, and a seal 6, made from a gathering 7 of the second end 9 of the inner tube 2.

There is no firm connection between the inner tube 2 and the shirred outer tube 1; these two coherent parts of the rod are joined only in the region of the transition 3 from the shirred outer tube to the inner tube of the rod, which is not shirred in the region of the orifice of the rod.

The rod, which is produced from the shirred stick, is accordingly only slightly shorter than the initial length of the shirred stick.

As shown in FIG. 2, a filling tube 11 of a filling device is introduced into the cavity 4, through the filling orifice 5 at the first end 8 of the rod. The inner tube 2 is closed by the seal 6, made from a gathering 7 of the second end 9 of the rod. A pasty material 12 just begins to be fed into the inner tube 2 in the direction of the seal 6.

It will be obvious to those skilled in the art that many modifications may be made within the scope of the present invention without departing from the spirit thereof, and the invention includes all such modifications.

What is claimed is:

1. A process for the manufacture of a tubular package filled with pasty material which comprises
    (a) positioning a filling tube of a filling device inside the inner tube of a tubular rod of flexible material, said rod comprising an inner tube substantially free from folds and a shirred outer tube, the hollow space of said shirred outer tube constituting a casing for said inner tube and said inner tube being a deshirred length of the tubular rod which is inverted into the hollow space of said shirred outer tube thus forming a double-walled rod, wherein the outside surface of said inner tube and the inside surface of said outer tube are in direct contact, the inner tube being integral with the outer tube at one of its ends and sealed at the other; in a manner such that the filling tube adjoins the seal of the rod, and
    (b) feeding pasty material from the filling device through the filling tube into said inner tube of the rod, and simultaneously turning the tube forming the shirred stick inside out under a frictional contact between the outside surface of the deshirred inner tube and the inside surface of the shirred outer tube, whereby the shirred outer tube is progressively unfolded by the pressure exerted in introducing the pasty material.

2. A process according to claim 1 in which a smoother, less structured surface on the outside of the tubular rod, made of cellulose hydrate, is turned outside in during the feeding of pasty material into the rod.

3. A process according to claim 1 in which the tubular rod is composed of fiber-reinforced cellulose hydrate and has a coating of polymeric material on the outside surface thereof which is turned inside during the feeding of pasty material into the rod.

4. A process according to claim 1 in which the tubular rod is composed of fiber-reinforced cellulose hydrate and has a coating of polymeric material on its inside surface which is turned outside during the feeding of pasty material into the rod.

5. A process according to claim 1 in which the tubular rod is composed of fiber-reinforced cellulose hydrate and has a coating of polymeric material comprising a vinylidene copolymer or a cationic resin on its outside surface which is turned inside during the feeding of pasty material into the rod.

6. A process according to claim 1 in which the tubular rod is composed of fiber-reinforced cellulose hydrate and has a coating of a chemical lubricating agent facilitating the formation of folds when shirring the tube, on its inside surface which is turned outside during the feeding of pasty material into the rod.

7. A process according to claim 1 in which the tubular rod is composed of fiber-reinforced cellulose hydrate and has a coating of polymeric material comprising a vinylidene copolymer or a cationic resin on its outside surface which is turned inside during the feeding of pasty material into the rod and which has a coating of chemical lubricating agent facilitating the formation of folds when shirring the tube, on its inside surface which is turned outside during the feeding of pasty material into the rod.

8. A process according to claim 1 in which the pasty material is a sausage composition.

* * * * *